UNITED STATES PATENT OFFICE.

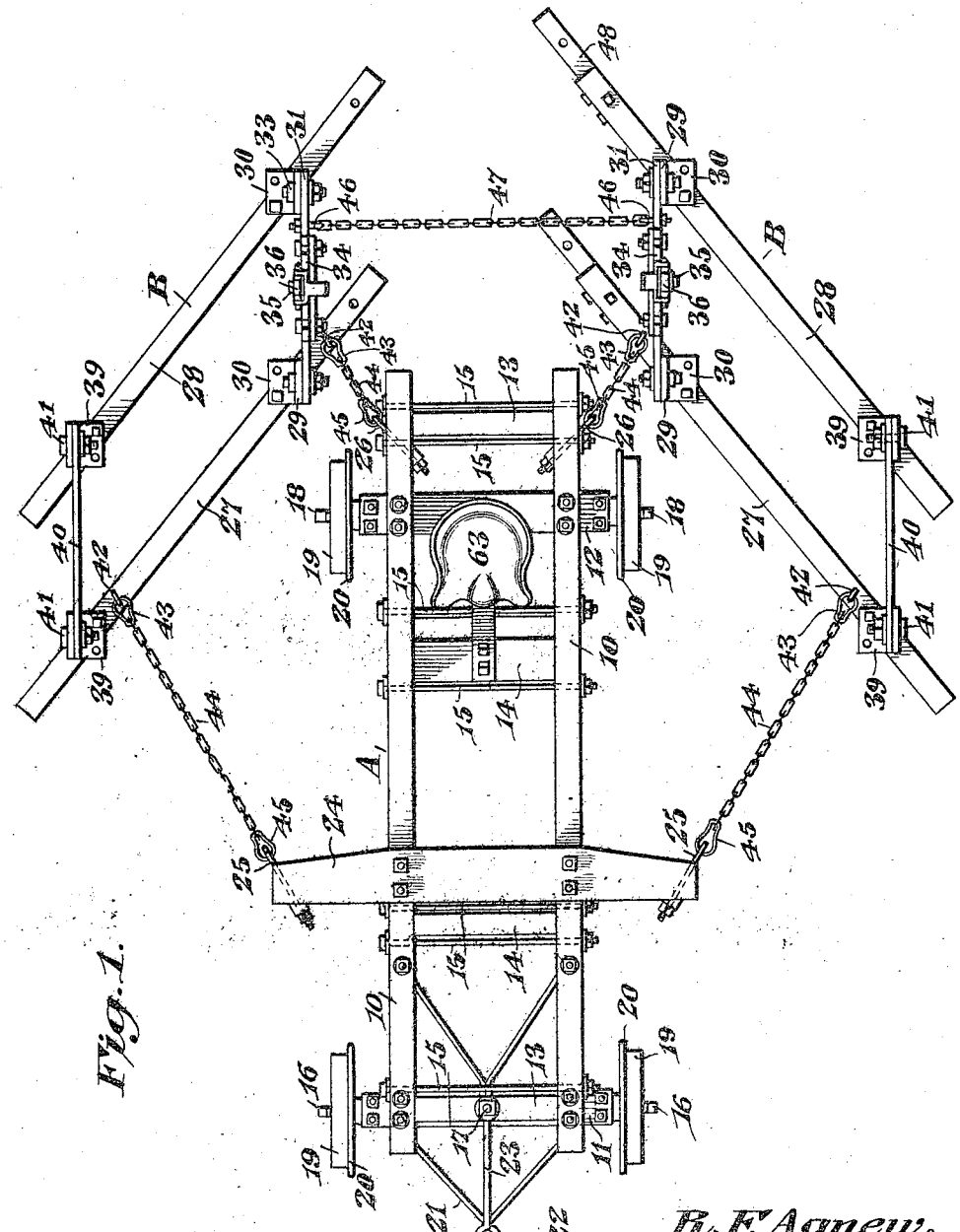

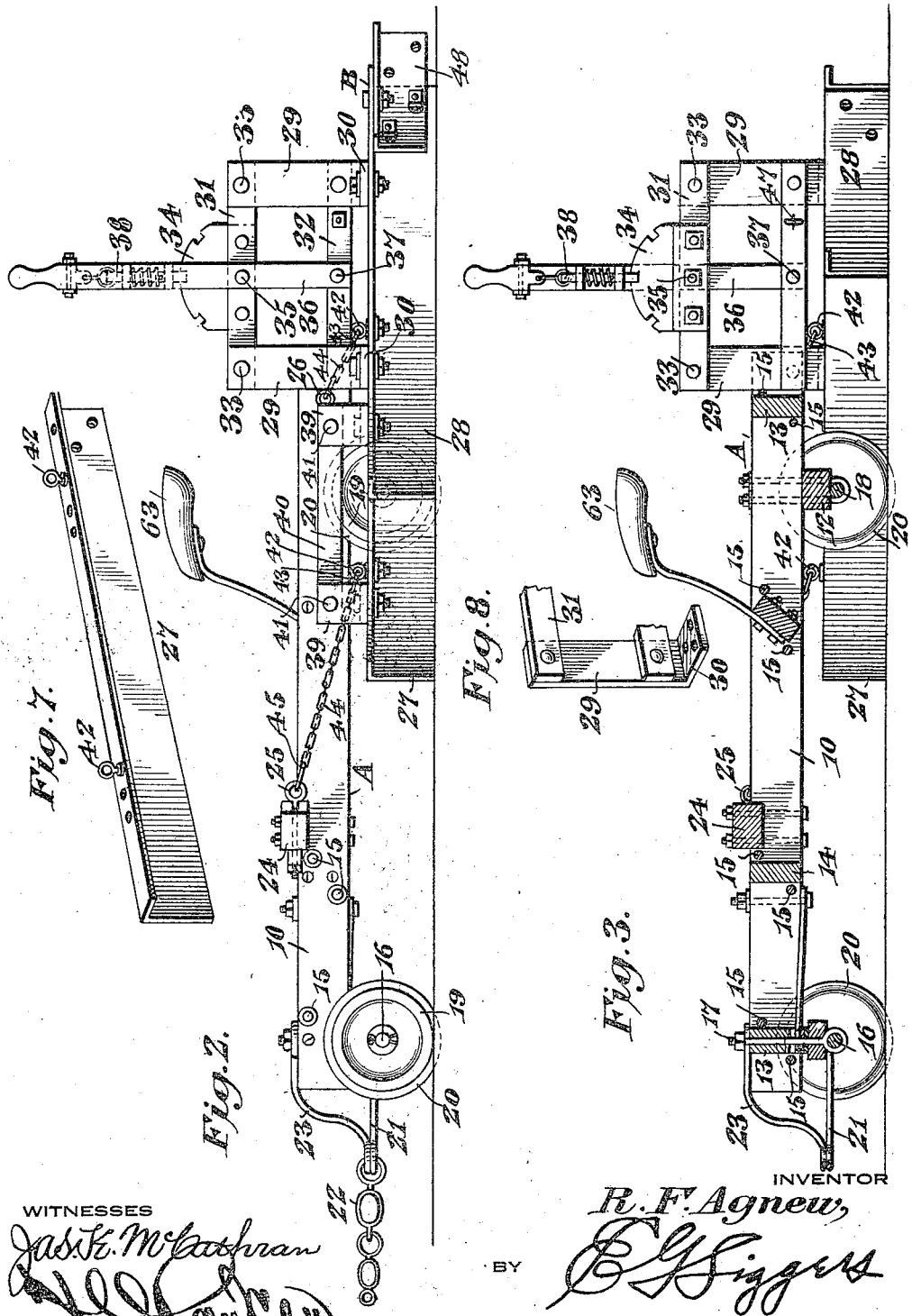

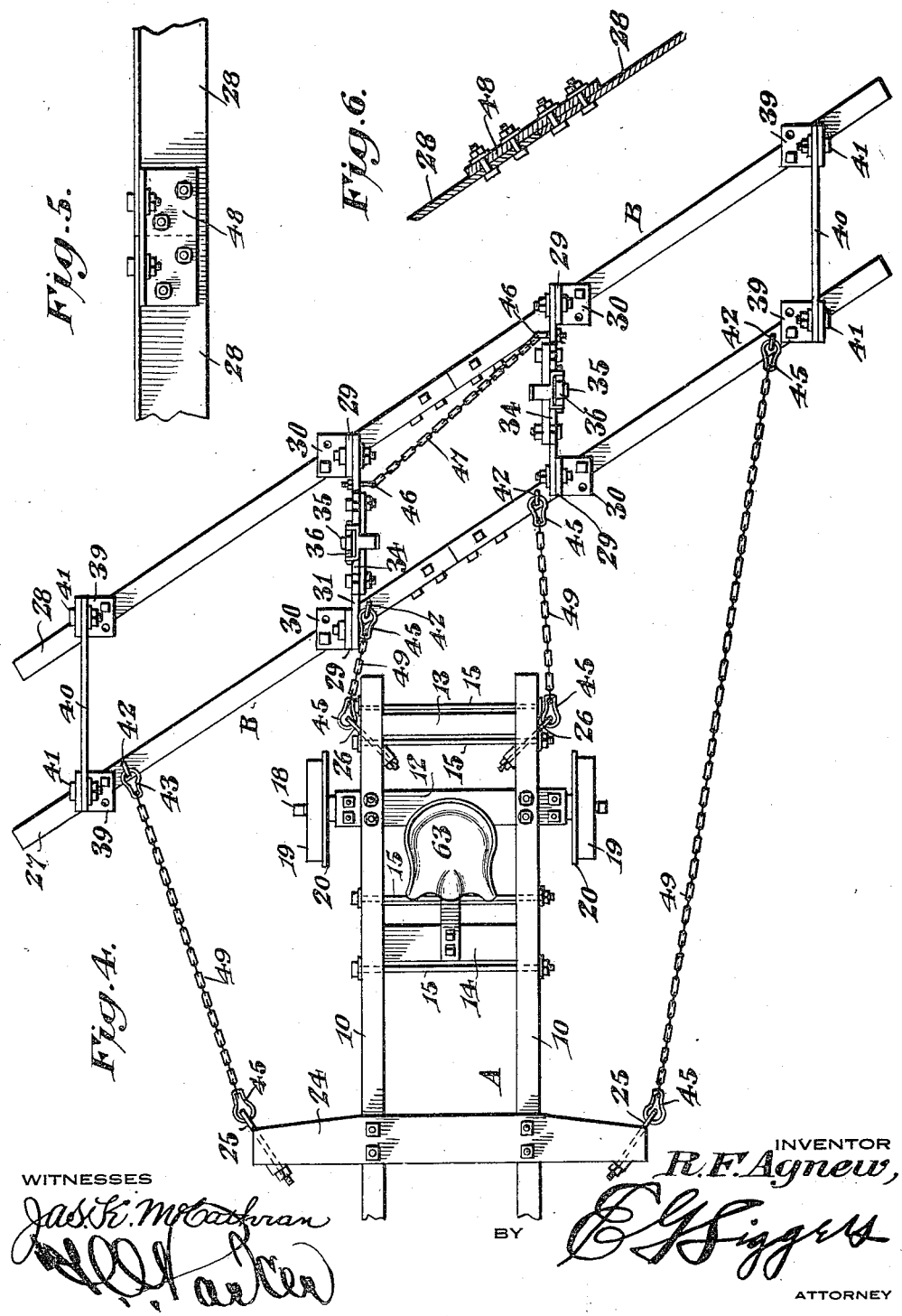

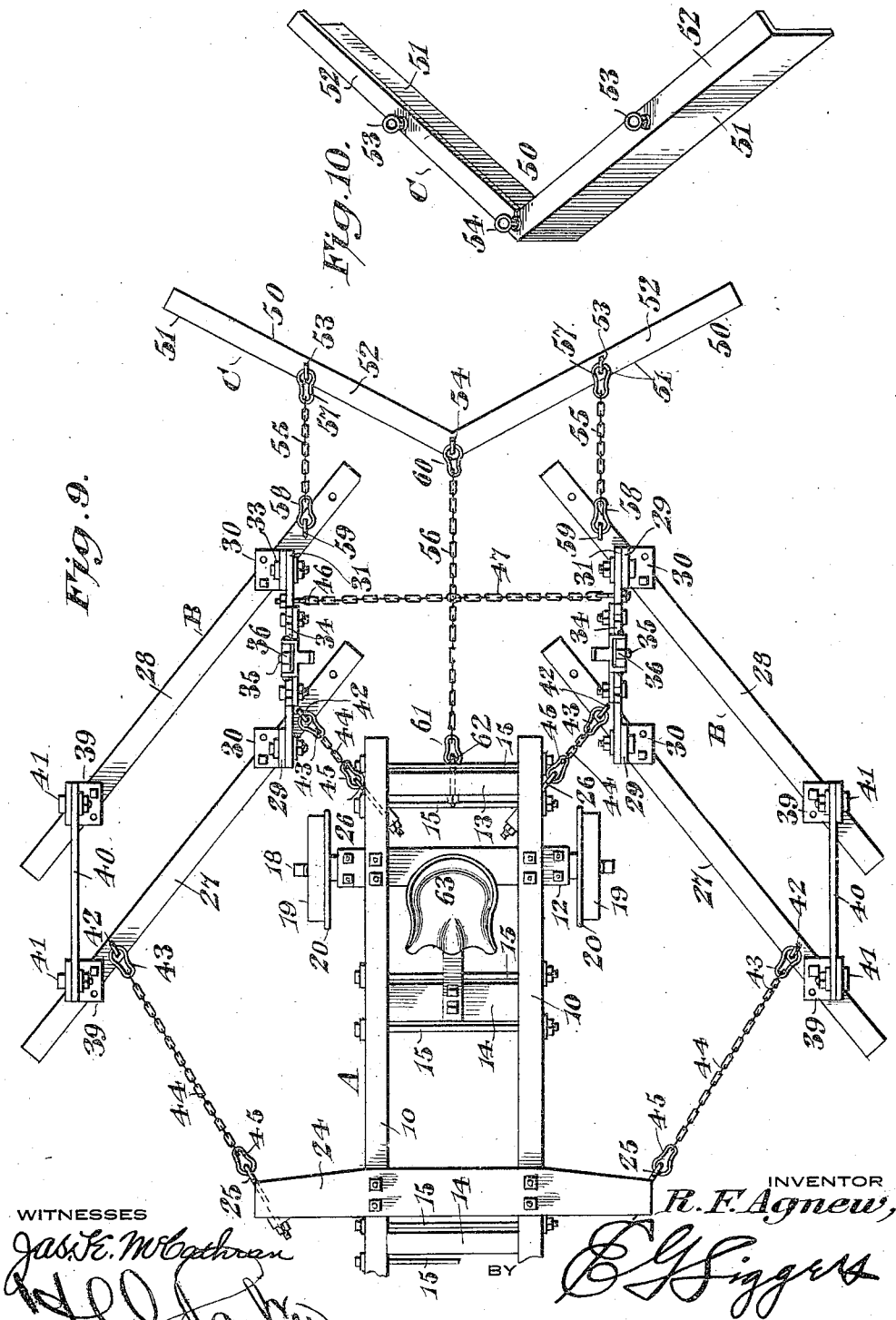

RICHARD FRANKLIN AGNEW, OF CALLAWAY, MINNESOTA.

DRAG.

1,278,412.  Specification of Letters Patent.  Patented Sept. 10, 1918.

Application filed October 23, 1917. Serial No. 198,136.

*To all whom it may concern:*

Be it known that I, RICHARD F. AGNEW, a citizen of the United States, residing at Callaway, in the county of Becker and State of Minnesota, have invented new and useful Drags, of which the following is a specification.

The invention relates to drags, and more especially to the class of surface scraping machines for grading roads, fields, or the like.

The primary object of the invention is the provision of a machine of this character, wherein the entire width of the surface area of a road or the like can be scraped, or only a portion thereof at the option of the operator of the machine, and the drag units, including the scraping plates or blades, will be guided by the wheeled truck, which prevents any endwise or swinging movements of said units, laterally of the surface, thereby assuring uniform grading of the same.

Another object of the invention is the provision of a machine of this character wherein the drag units including the scraping plates or blades are held in trailing positions through the medium of flexible connections, and are readily and easily adjusted to vary the scraping action thereof accordingly to the condition of the surface to be graded.

A further object of the invention is the provision of a machine of this character wherein a plurality of drag units are employed, certain of the units being disposed in forwardly divergent relation to each other at opposite sides of the main truck for the scraping of the road surface, while the remaining unit is disposed crosswise at the center line of draft of the main truck to scrape the surface at the highest point of the crown thereof, thereby avoiding the formation of a center ridge on the road surface.

A still further object of the invention is the provision of a machine of this character, wherein the drag units can be bodily placed upon the truck when not in use for the easy transportation thereof from one locality to another with despatch, thus saving labor and time in the hauling of the same, and assuring convenience in the handling of the units.

A still further object of the invention, is the provision of a machine of this character, which is comparatively simple in construction, thoroughly reliable and efficient in operation, strong, durable, easily and quickly adjusted, and inexpensive to manufacture.

The invention will be best understood, from a consideration of the following detailed description, taken in connection with the accompanying drawings, forming part of this specification, with the further understanding that while the drawings show a practical form of the invention, the latter is not confined to any strict conformity with the showing of the drawings, but may be changed or modified, so long as such changes or modifications come within the scope of the appended claims.

In the accompanying drawings:

Figure 1 is a top plan view of the machine constructed in accordance with the invention, showing the drag units at opposite sides of the truck in forwardly divergent relation to each other.

Fig. 2 is a side elevation.

Fig. 3 is a central longitudinal sectional view through the machine.

Fig. 4 is a view similar to Fig. 1, showing the drag units joined and disposed diagonally crosswise to the line of draft of the machine.

Fig. 5 is a fragmentary rear elevation of the joined scraper plates or blades of the units.

Fig. 6 is a horizontal sectional view therethrough.

Fig. 7 is a perspective view of one of the scraper plates or blades.

Fig. 8 is a fragmentary perspective view of one of the adjusted frames for one drag unit.

Fig. 9 is a fragmentary top plan view showing a slight modification of the invention.

Fig. 10 is a perspective view of the central scraper unit.

Similar reference characters indicate corresponding parts throughout the several views in the drawings.

Referring to the drawings in detail, A designates generally a wheeled truck, which includes spaced parallel side rails 10, the front and rear cross bolsters 11 and 12, respectively, the end cross braces 13, the intermediate cross braces 14, the cross tie rods 15, which are passed through the side rails on opposite sides of the braces 13 and 14, and bolted to said rails, the front turning axle 16, which is fast with the bolster 11, being adapted to turn therewith upon the central pivot or king bolt 17, mounted in the front end bars 13, the stationary rear axle 18, and the traction wheels 19, which are journaled upon said axle 16 and 18 beyond opposite sides of the truck. The wheels 19 being formed with peripheral flanges 20, which bite into the ground surface to prevent sidewise skidding or movement of the truck when being advanced. Connected with the front bolster 11, is a front hound 21, to which is connected a double-tree 22, of the ordinary construction for the attachment of draft animals.

However, it is to be understood, that it is contemplated within the scope of the invention to otherwise pull the truck either by traction engine, motive power, or the like. Connected with the central pivot or king bolt 17, and to the doubletree 22, is a suitable hanger 23, which prevents the sagging of the front hound 21, and coacts therewith on the turning of the front axle 16.

Mounted upon the truck A, and secured to the side rails 10, thereof in advance of the crosswise center of said truck, is a transversely disposed drag beam 24, which extends beyond the opposite sides of said truck, and has mounted in its end portions rearwardly divergent or angularly disposed eye bolts 25, while mounted in the side rails 10, of said truck, near its rear end, are rearwardly divergent or diagonally disposed similar eye bolts 26, and these bolts 25 and 26, are designed for the flexible connection of drag units B to the truck, which drag units will be hereinafter fully described.

The drag units B, are preferably two in number, and each comprises a pair of parallel angular shaped corresponding front and rear scraper plates or blades 27 and 28, respectively, the same being of uniform length with respect to each other. The angular formation of these plates or blades, assures strength and rigidity. Mounted on each pair of scraper plates or blades 27 and 28, is an adjusted frame, which is in the form of a parallelogram, including spaced uprights or posts 29, the base or foot 30 of each being bolted or otherwise secured to the short angular flange of said plate or blade at a point spaced from the inner end thereof, and upper and lower cross bars 31 and 32, respectively, which are pivoted at 33 to the posts or uprights 29, in spaced parallel relation to each other. Fixed to the upper bar 31, medially thereof is a notched segment 34, while centrally pivoted to the segment 34, and the upper bar 31, at 35 is an intermediate portion of throw lever 36, which has its lower end pivoted at 37, to the lower bar 32, at the center thereof, the lever being fitted with a spring held hand released latch 38, which engages in any one of the notches of the segment 34, for the locking of the lever 36, in adjusted position. On operating the lever 36, the adjusting of the frame will be effected for the angular or vertical displacement of the scraper plates or blades 27 and 28, to vary the cutting or scraping action thereof.

Bolted or otherwise secured to the scraping plates or blades 27 and 28, of each drag unit B, near the outer ends thereof, are angle brackets 39, to which is pivoted a connecting rod or link 40, the ends of the same having the pivots 41, passed therethrough, which connect said rod or link to the angle brackets. These rods or links 40, together with the adjusting frames, hold the scraper plates or blades 27 and 28, in spaced parallel relation to each other, the links or rods 40, and the adjusting frames, being disposed parallel with the line of draft of the truck, while the plates or blades 27 and 28, are diagonally disposed relative thereto, when flexibly connected in trailing position to the truck.

Mounted on the front scraper plates or blades 27, of the drag units, near the adjusting frames and brackets are eye bolts 42, to which are connected terminal links 43, of chains 44, while the other terminal links 45 of said chains 44, are connected to the eye bolts 25 and 26, on the drag beam 24, and side rails 10, of the truck A respectively. It is to be understood, however, that in lieu of the chains 44, other suitable flexible connections may be substituted for the trailing of the drag unit B, by the truck A in the operation of the machine. The chains 44, are of the required lengths, preferably a long front pair and a short rear pair, while mounted in the lower bars 32 of the adjusting frames on the drag units, are eye bolts 46, to which are connected ends of a cross chain 47, which prevents the lateral spreading of the drag units B, when arranged in forwardly divergent relation to each other on opposite sides of the truck A, as is clearly shown in Fig. 1 of the drawings. In this position the drag units B, will scrape the surface for the crowning thereof, the truck A, being arranged centrally with reference to the drag units, and the flanges 20, of the wheels 19, thereof engaged in the surface, will prevent any lateral displacement or the swinging of the drag units to either side of the surface, while the chain 47, prevents the spreading apart of the drag units with relation to each other, when in operation for reshaping or finishing the surface.

One of the drag units B, has bolted or otherwise fixed to the front and rear scraper plates or blades 27 and 28, at their inner ends and at the rear sides thereof, angular coupling or uniting plates 48, which are adapted to be bolted or otherwise secured to the inner ends of the front and rear plates or blades 27 and 28, of the other drag unit for the detachable joining of both units to each other, as is clearly shown in Figs. 4, 5 and 6 of the drawings. In this manner the entire width of the road surface, or the like can be scraped by the plates or blades 27 and 28, of the units when connected together, and disposed in trailing relation to the truck A, diagonally crosswise of said road surface, it being understood, of course, that the chains 49, connecting the drag units to the beam 24, and the truck A, as is shown in Fig. 4 of the drawings, are of a greater length, than the chains 44, shown in Fig. 1 of the drawings, connecting the separating drag units B, at opposite sides of the truck A. In both arrangements of the drag units B, the truck A, as shown in Figs. 1 and 4 of the drawings, maintains said units when scraping a road surface, against lateral displacement crosswise of the road, or from swinging movement during the operation of the machine.

In Figs. 9 and 10 of the drawings there is shown a slight modification of the invention, wherein in addition to the drag units B, there is employed a central drag unit C, which comprises an angle beam 50, preferably bent on itself to provide the forwardly convergent extensions or limbs 51, the bight in the beam being located medially thereof. Mounted in any suitable manner in the horizontal flanged portion 52 of this beam at the medial point thereof and at equal distances on opposite sides of the same, are eye bolts 54 and 53, respectively, for a purpose presently described.

The beam 50 is employed when the drag units B are disposed at opposite sides of the truck A in their separated relation and disposed angularly to the line of draft, the drag unit C being disposed in the path of the gap between the drag units B. Connected to the eye bolts 53 and 54 of this unit, are the rear terminal links 57 and 60 of short and long chains 55 and 56, respectively, the short chains being provided with forward terminal links 58 which are engaged with eye bolts 59 mounted in the rear scraper plates or blades 28 near their innermost ends, while the long chain 56 has its rear terminal link 60 connected with the medial eye bolt 54 on the angle beam 50, and its forward terminal link 61 connected with an eye-bolt 62 mounted in the rearmost cross-beam or brace 13 of the truck A medially thereof, so that the drag unit C will trail at a point rearwardly of the drag unit B.

The drag unit C when in its trailing position relative to the drag units B, will act upon the road surface to scrape the same at the highest point of the crown thereof, so as to avoid the formation of a ridge centrally of the road surface. The drag unit C will disperse the loose dirt laterally of the road surface to opposite sides thereof as such loose dirt works inwardly from the scraper plates 27 and 28 of the drag units B into the open gap between said units, and thereby avoiding the formation of the road surface at a high level centrally thereof, with the result that the road surface will be rendered smooth and will have the proper crown shape thereto.

Now, when the drag units B and C are not in use for the scraping of the road bed, or the like, the same can be placed upon the truck A, for the easy transportation thereof from one locality to another. The drag units B when in separated relation, or when joined together, can be readily adjusted to bring the scraping plates or blades 27 and 28, to perpendicular or angular relation to the surface to be acted upon, and thereby vary the scraping operation for the smoothing and finishing of the surface.

The throw levers 36 are arranged in convenient reach of the operator of the machine, and may be independently operated, as desired, to maintain the scraping plates or blades in a vertical position, or tilt either separately forward or rearwardly, according to the nature of the surface to be passed over, or acted upon, and the result desired in the smoothing or finishing of the surface.

The truck A in both the preferred and modified forms of the invention, carries the usual operator or driver's seat 63.

From the foregoing, it is thought that the construction and manner of operation of the machine will be clearly understood, and, therefore, a more extended explanation has been omitted.

What is claimed is:—

1. A drag of the character described, composed of two units arranged in forwardly divergent relation to each other, each unit comprising a plurality of drag plates arranged one behind the other, means for detachably connecting the plates of the units together, a wheeled truck having front and rear wheels, short flexible connections between the truck in rear of the wheels and the inner ends of the units, long flexible connections between the intermediate portion of the truck between the front and rear wheels and the other end portions of said unit, and a flexible connection between the units in rear of the truck to hold the units from spreading apart, said units being adapted to be carried on the truck when the drag is not in operation.

2. A drag comprising a truck having front and rear wheels, a drag beam fixed transversely to the body of the truck between the front and rear wheels, and extending at each side beyond the said body and also beyond a longitudinal line connecting the front and rear wheels, a pair of scraper units arranged at each side of the rear portion of the truck and converging toward each other with their inner ends extending inwardly beyond the rear wheels, long flexible connections joining the outer ends of the scraper units with the outer ends of the drag beam, and short flexible connections joining the inner ends of the scraper units with the truck body at points rearward of the rear wheels and a separate flexible connection between the units in rear of the truck to hold them from spreading apart, said units being adapted to be carried on the truck when the drag is not in operation.

3. A drag of the character described, comprising a wheeled truck having front and rear wheels, scraper units disposed on opposite sides of the truck and extending rearwardly beyond the same in forwardly divergent relation to each other, each unit composed of a plurality of drag plates arranged one behind the other, short flexible connections between the rear end of the truck rearwardly of the rear wheels and the inner end portions of the units, long flexible connections between the intermediate portion of the truck between the front and rear wheels and the outer end portions of said units, an angularly shaped drag unit disposed rearwardly of the first named units directly in rear of the truck and spanning the space between the rear ends of said units, short flexible connections between the inner end portions of the first named units and the outer end portion of the last named unit, and a long flexible connection between the rear end of the truck and the central portion of the last named unit.

4. A drag of the character described, comprising a wheeled truck, a plurality of drag units, a pair of said units each including a plurality of drag plates arranged one behind the other, said pair of units being disposed rearwardly of the truck in spaced inwardly divergent relation to each other, while the remaining unit is disposed rearwardly of said pair of units centrally relatively thereto, a drag beam disposed transversely on said truck, long chains connecting the outer end portions of the pair of drag units to the ends of said beam, short chains connecting the inner end portions of said pair of drag units to the rear end of said truck, and chains connecting said remaining drag unit to the inner end portions of the pair of drag units and the rear end of the truck.

In testimony that I claim the foregoing as my own, I have hereto affixed my signature in the presence of two witnesses.

RICHARD FRANKLIN AGNEW.

Witnesses:
ALBERT FONSON,
EDITH E. AGNEW.

Copies of this patent may be obtained for five cents each, by addressing the "Commissioner of Patents, Washington, D. C."